(12) United States Patent
Shafer et al.

(10) Patent No.: US 8,600,529 B2
(45) Date of Patent: Dec. 3, 2013

(54) AUDIO FADE CONTROL

(75) Inventors: James Hart Shafer, Seattle, WA (US); Peter Green, Kirkland, WA (US)

(73) Assignee: Adobe Systems Incorporated, San Jose, CA (US)

( * ) Notice: Subject to any disclaimer, the term of this patent is extended or adjusted under 35 U.S.C. 154(b) by 1338 days.

(21) Appl. No.: 11/585,556

(22) Filed: Oct. 23, 2006

(65) Prior Publication Data

US 2013/0167026 A1 Jun. 27, 2013

(51) Int. Cl.
*G06F 17/00* (2006.01)

(52) U.S. Cl.
USPC .......................................................... 700/94

(58) Field of Classification Search
USPC ......... 700/94; 381/61, 98–109; 715/700, 716, 715/727, 728
See application file for complete search history.

(56) References Cited

U.S. PATENT DOCUMENTS 4,947,440 A * 8/1990 Bateman et al. .............. 381/107

OTHER PUBLICATIONS

Pro Tools Version 7.0 Reference Guide Copyright 2005.*

* cited by examiner

*Primary Examiner* — Andrew C Flanders
(74) *Attorney, Agent, or Firm* — Wolfe-SBMC

(57) ABSTRACT

Systems, methods, and computer program products for editing audio data are provided. In some implementations, a method is provided. The method includes receiving digital audio data and displaying a visual representation of the audio data. The method also includes receiving a single graphical user input gesture defining a fade curve, the fade curve specifying a fade length and a fade shape of a fade effect.

27 Claims, 7 Drawing Sheets

AUDIO FADE CONTROL

BACKGROUND

This specification relates to editing audio data.

Different visual representations of audio data, particularly digital audio data, are commonly used to display different features of the audio data. For example, an amplitude waveform shows a representation of audio intensity in the time-domain (e.g., a graphical display with time on the x-axis and intensity on the y-axis). Other visual representations display different features of the audio data such as frequency, pan position, and phase.

The audio data can be edited. For example, a user may apply different processing operations to portions of the audio data to generate particular audio effects. One typical editing operation is to apply a fade effect to a portion of the audio data (e.g., the beginning or end of the audio data). The fade effect provides a smooth ramping of audio volume up or down. For example, the audio data can begin very softly and become gradually louder over a fade length, e.g., a few seconds. Applying the fade effect to audio data conventionally requires multiple user inputs to define the shape and length of the fade.

SUMMARY

Systems, methods, and computer program products for editing audio data are provided. In general, in one aspect, a method and computer program product, respectively, are provided. The method and computer program product include receiving digital audio data, displaying a visual representation of the audio data, and receiving a single graphical user input gesture defining a fade curve, the fade curve specifying a fade length and a fade shape of a fade effect.

Implementations can include one or more of the following features. The gesture can place a cursor relative to a first axis and a second axis to specify the fade effect. The first axis can be a time axis and setting the fade length can include determining a position of the cursor along the time axis in the visual representation. The second axis can be a fade shape axis and setting the fade shape can include determining a position of the cursor along the fade shape axis in the visual representation. The position of the cursor along the fade shape axis can be determined according to a distance from a fade tool to a cursor along the fade shape axis. Displacement in a first direction along the fade shape axis can define a fade type having a first shape and displacement in a second direction along the fade shape axis can define a fade type having a second shape.

An algorithm can be used to associate the position of the cursor along the fade shape axis with a function defining a shape of the fade. The first shape is an exponential curve or a logarithmic curve. The method and computer program product can further include displaying a visual representation of the fade in response to the user input including displaying a fade curve illustrating the shape of the fade with respect to time. The visual representation of the audio data can be modified to preview the effect of the fade. The method and computer program product can further include editing the audio data according to the defined audio fade including applying a gain function to the audio data according to the define fade shape and fade length.

In general, in one aspect, a method is provided. The method includes receiving digital audio data and displaying a visual representation of the audio data. The method also includes receiving a graphical user input placing a cursor relative to a time axis to specify a fade effect, the position of the cursor taken along the time axis specifying a fade length of the fade effect, and a distance and direction of the cursor away from the time axis specifying a fade shape of the fade effect.

In general, in one aspect, a method is provided. The method includes receiving digital audio data and displaying a visual representation of the audio data. The method also includes receiving a graphical user input moving a cursor to specify a fade effect, movement of the cursor parallel to a time axis changing a fade length of the fade effect, and movement of the cursor perpendicular to the time axis changing a fade shape of the fade effect.

In general, in one aspect, a system is provided. The system includes a user interface device and one or more computers operable to interact with the user interface device and to receive digital audio data, display a visual representation of the audio data, and receive a single graphical user input gesture defining a fade curve, the fade curve specifying a fade length and a fade shape of a fade effect.

Implementations of the system can include one or more of the following features. The one or more computers can include a server operable to interact with the user interface device through a data communication network, and the user interface device can be operable to interact with the server as a client. The user interface device can include a personal computer running a web browser or a mobile telephone running a wireless application protocol (WAP) browser. The one or more computers can include one personal computer, and the personal computer can include the user interface device.

Particular embodiments of the subject matter described in this specification can be implemented to realize one or more of the following advantages. A user can efficiently define both an audio fade length and shape with a single user input instead of separately defining fade length and shape in distinct operations. A single fade tool provided within a user interface allows the user to smoothly define both fade length and shape. The user can quickly determine the desired fade using a fade curve displayed in the visual representation that changes with user input. Additionally, the system can automatically display a desirable fade curve using inputs provided by the user, for example, by taking the user input fade length and a position on a fade shape axis and providing a particular curve.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Figure 1:
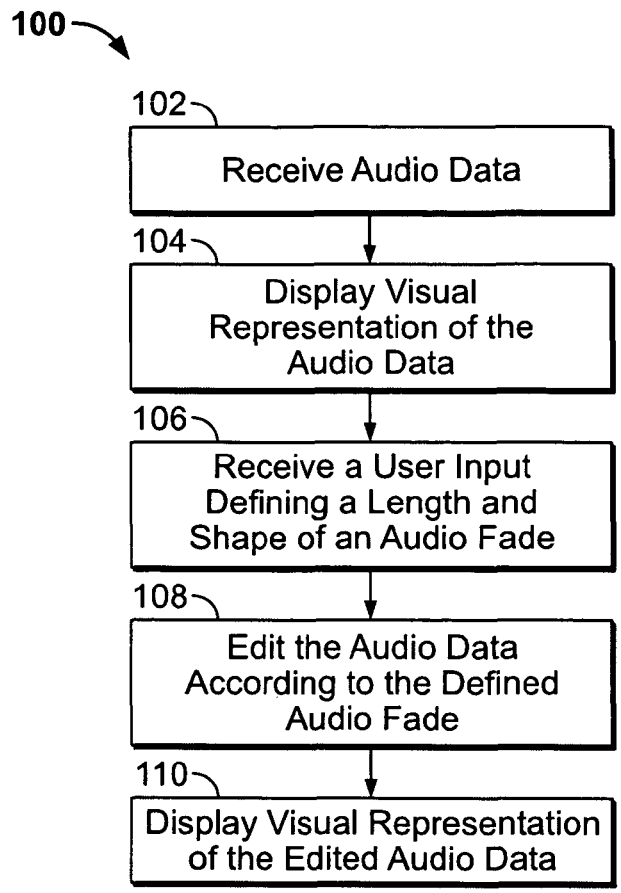
FIG. 1 shows an example process for performing audio fade.

FIG. 1 shows an example process 100 for performing audio fade. For convenience, the process will be described with reference to a computer system that performs the process. The computer system receives digital audio data (step 102). The audio data is received, for example, as part of an audio file (e.g., a WAV or MP3 file). The audio file can be locally stored or retrieved from a remote location. The audio data can be received, for example, in response to a user selection of a particular audio file.

The system displays a visual representation of the audio data (step 104). For example, a particular feature of the audio data can be plotted and displayed in a window of a graphical user interface. The visual representation can be selected to show a number of different features of the audio data. For example, visual representation can be a frequency spectrogram, an amplitude waveform, a pan position plot, or a phase display. In some implementations, the visual representation is an amplitude waveform. The amplitude waveform shows audio intensity (i.e., amplitude) in the time-domain (e.g., a graphical display with time on the x-axis and intensity on the y-axis). In an alternative implementation, the system can define and perform audio fade without a visual representation of the audio data, for example, using audio playback or numerical data associated with the audio data.

Figure 3:
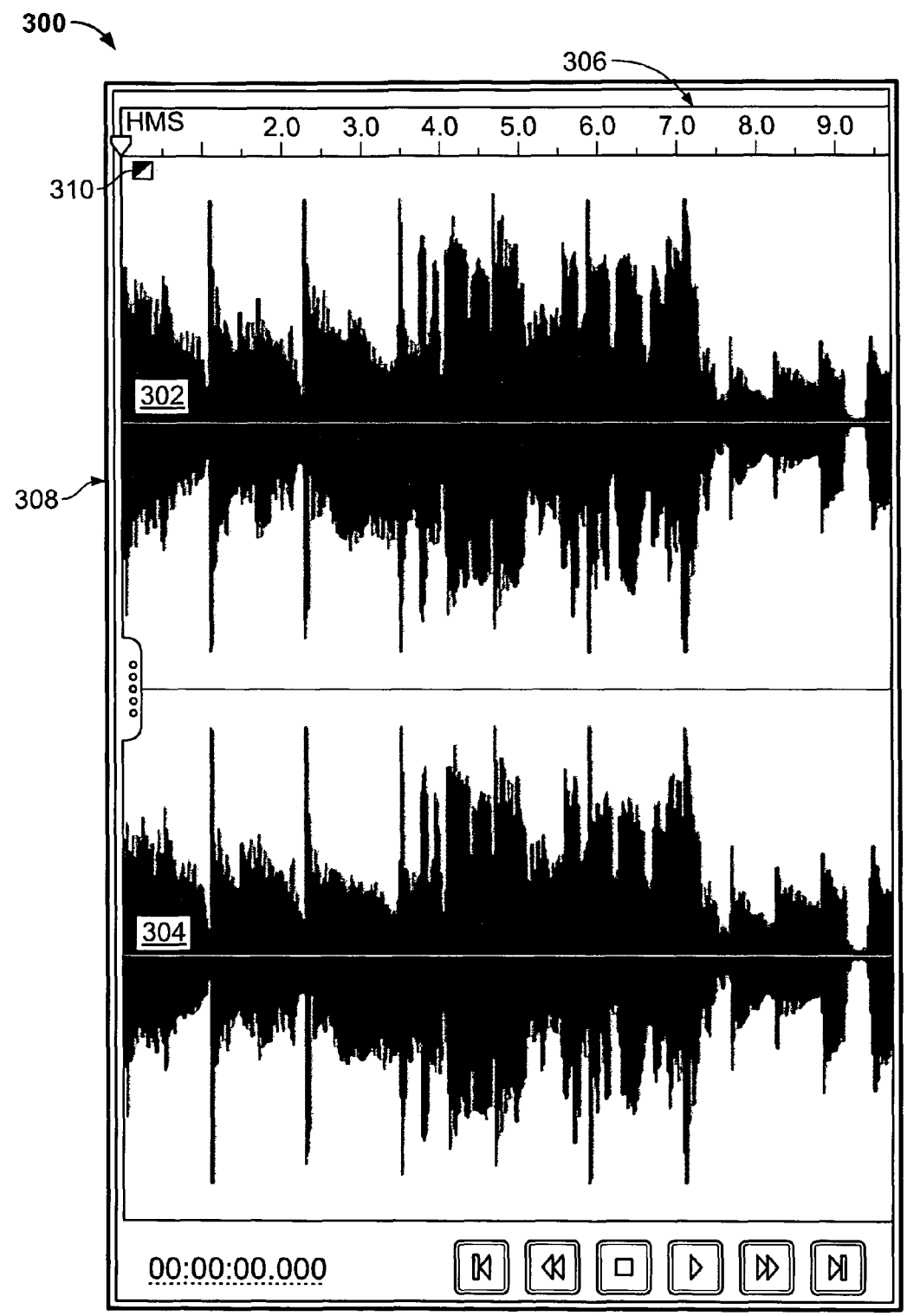
FIG. 3 shows an example display of amplitude waveforms.

FIG. 3 shows an example display 300 of amplitude waveforms generated by the system from the audio data and displayed on a display device. The display 300 shows the overall intensity of the audio data in the time-domain. In particular, the display 300 shows amplitude waveforms 302 and 304. The amplitude waveforms 302 and 304 represent, for example, stereo audio data from two distinct channels (i.e., separate audio streams of the audio data provided by different recording devices, e.g., separate microphones). However, a single audio channel, or multi-channel audio data can similarly be displayed. With respect to the amplitude waveform 302, the y-axis 308 of the display 300 represents intensity, for example, in decibels. The x-axis 306 of the display 300 represents time, for example, in seconds. The display 300 is part of a user interface that includes a fade control 310. The fade control 310 can be used to define a fade length and shape as described in greater detail below.

In some implementations, the user can zoom in or out of either axis of the display 300 independently. Zooming allows the user to examine particular portions of the visual representation, e.g., an amplitude waveform, over a particular time period. The zooming modifies the scale of a selected axis, increasing or decreasing the range of values for the displayed visual representation. The visual representation of the amplitude waveform 302 changes to correspond to the selected zooming range. For example, a user can zoom in to display the audio data corresponding to a small time range of only a few milliseconds in order to see the detailed structure of the amplitude waveform 302. Alternatively, the user can zoom out in order to display the entire amplitude waveform 302 for the audio data.

As shown in FIG. 1, the system receives a graphical input defining a length and a shape of an audio fade effect (step 106). For example, the graphical input can be a single graphical user input gesture. The graphical input can include a user input using a fade tool in the user interface (e.g., fade tool 310). For example, the user can use the fade tool to define a time length of the fade (e.g., from time t=0 to a user defined endpoint time for a fade effect at the beginning of the audio data) and a particular shape of the fade. The defined fade length and shape parameters are used to define a particular fade curve (e.g., the parameters are input into a functional definition for a curve using the fade shape and fade length as variable). For example, the fade shape defines parameters of a fade curve of how the amplitude of the audio data responds over time (e.g., a gain or compression function). For example, the fade curve can provide zero amplitude at time t=0 where the fade curve gradually increases to an un-faded amplitude at the fade endpoint. Defining the fade length and shape is described in greater detail below. The input can be provided using a user controlled input device such as a mouse, trackball, joystick, or other two dimensional control.

The system edits the audio data according to the defined audio fade (step 108). For example, the system can compress the amplitude of the audio data according to the defined fade shape over the defined fade length. Thus, for a fade amount that changes over time, a different amount of compression is applied to the audio data with respect to time according to a particular gain function (e.g., particular application of amplification or compression of the audio data with time) defined for a particular fade length and shape. Audio data outside the fade length is not affected. For example, the defined fade curve can correspond to a particular gain function, e.g., according to an algorithm relating a particular fade curve definition (i.e., a particular function defining the fade curve) with a corresponding gain/compression function to apply.

The system displays a visual representation of the edited audio data (step 110). The user can then perform other operations on the audio data. For example, the user can further edit the audio data including editing the entire audio data or editing a particular portion of the audio data. Additionally, the user can save, transmit, or play the edited audio data.

Figure 2:
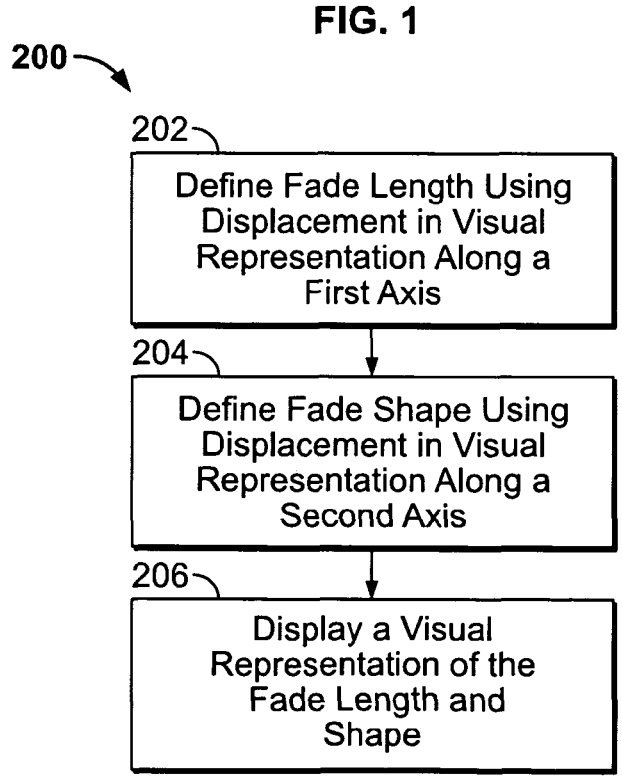
FIG. 2 shows an example process for defining a fade length and shape according to a received input.

FIG. 2 shows an example process 200 for setting a fade length and shape according to a received user input. The system selects a fade length using the displacement of a fade tool along a time axis (step 202). For example, a fade tool can be dragged by a user input. For example, the x-axis of the visual representation is the time axis and dragging the fade tool horizontally can define a fade length with respect to the time shown in the x-axis. The time axis for the fade tool can be defined as a horizontal axis coincident with the fade tool position. Alternatively, the fade length can be defined according to a fade axis that is independent of the time axis for the displayed audio data. For example, the fade axis can be defined dynamically according to a horizontal line corresponding to any vertical position in which the user input gesture began in the display.

In some implementations, the fade tool is represented (e.g., by an icon) on the display, which can be selected by the user (e.g., using a cursor or a particular keyed input). The user can then drag the fade tool while the selection is maintained (e.g., until released, for example, by releasing a mouse button or a held key). In some implementations, the user can drag the fade tool both horizontally and vertically. Alternatively, the fade tool can only move either horizontally or vertically, but not both.

The system selects a fade shape using a displacement of the fade tool on the visual representation along a second axis (step 204). For example, the fade tool can be dragged along a second direction (e.g., vertically) on the display in response to user input to define the fade shape. Defining the fade shape includes defining a fade type and amount. The direction in which the user drags a fade tool can define a type of fade (e.g., linear, exponential, logarithmic). The amount in which the user drags the fade tool along the vertical axis can define the fade amount (e.g., the magnitude of the fade curve).

In some implementations, the user's cursor position relative to the fade tool defines the fade shape. For example, the cursor can be linked to the fade tool when selected. As a result, once the fade tool has been selected, the fade tool can define a fade shape and length according to the cursor movement. Thus, while position of the fade tool horizontally using the cursor defines fade length, position of the cursor vertically defines the fade shape (e.g., along a second, or fade shape, axis). Additionally, the shape of the fade can be a curve defined by the direction and amount of the vertical displacement from the fade tool. For example, a cursor position coincident with the icon representing the fade tool can define a linearly shaped fade curve. In some implementations, a displacement above the fade tool can define a logarithmic fade curve and a displacement below the fade tool can define an exponential fade curve. In other implementations, the relative position of the cursor can define other fade types defined by other mathematical functions.

The particular shape of the logarithmic or exponential curve varies depending on the distance (e.g., between the fade tool and the cursor or vertical movement of the fade tool). For example, for an exponential fade, an algorithm associates a particular gain function defining an exponential curve with variables for the fade length and the vertical displacement of the cursor. The vertical displacement can be defined, for example, according to the pixel distance between the cursor and the fade tool. In some implementations, a greater pixel displacement beneath the fade tool corresponds to a steeper exponential curve (i.e., the slope of the curve increases with time at a greater rate).

In some implementations, the user can define the fade shape and length simply by selecting a position within the visual representation using the cursor. For example, the user can place the cursor in a desired position and select to define a fade curve corresponding to that position. The fade length and shape can be defined according to the coordinates of the cursor position with respect to a time axis and a fade shape axis.

The system displays a visual representation of the selected fade length and shape (step 206). In some implementations, a graphical representation of the fade curve can be displayed over the visual representation. For example, a line can be drawn on the visual representation showing the fade curve. The fade curve can be drawn from the beginning of the visual representation to the endpoint time of the fade length (e.g., when the fade effect is at the beginning of the audio data, however, with other fade effects the fade curve can be drawn from different points in the visual representation).

Additionally, the region covered by the fade effect can be illustrated by an overlay for that portion of the visual representation, indicating the portion of the visual representation to be edited by the fade effect. The overlay can, for example, highlight or shade the portion of the visual representation to be edited. In some implementations, the fade curve changes substantially in real-time with the user input to the fade tool to provide feedback to the user with regard to how the fade shape and length changes in response to user input to the fade tool.

In other implementations, the visual representation can be modified to illustrate the resulting amplitude waveform resulting from application of the fade effect. In some implementations, the shape of the underlying amplitude waveform can change with the user input to the fade tool in order to provide feedback to the user.

Figure 4:
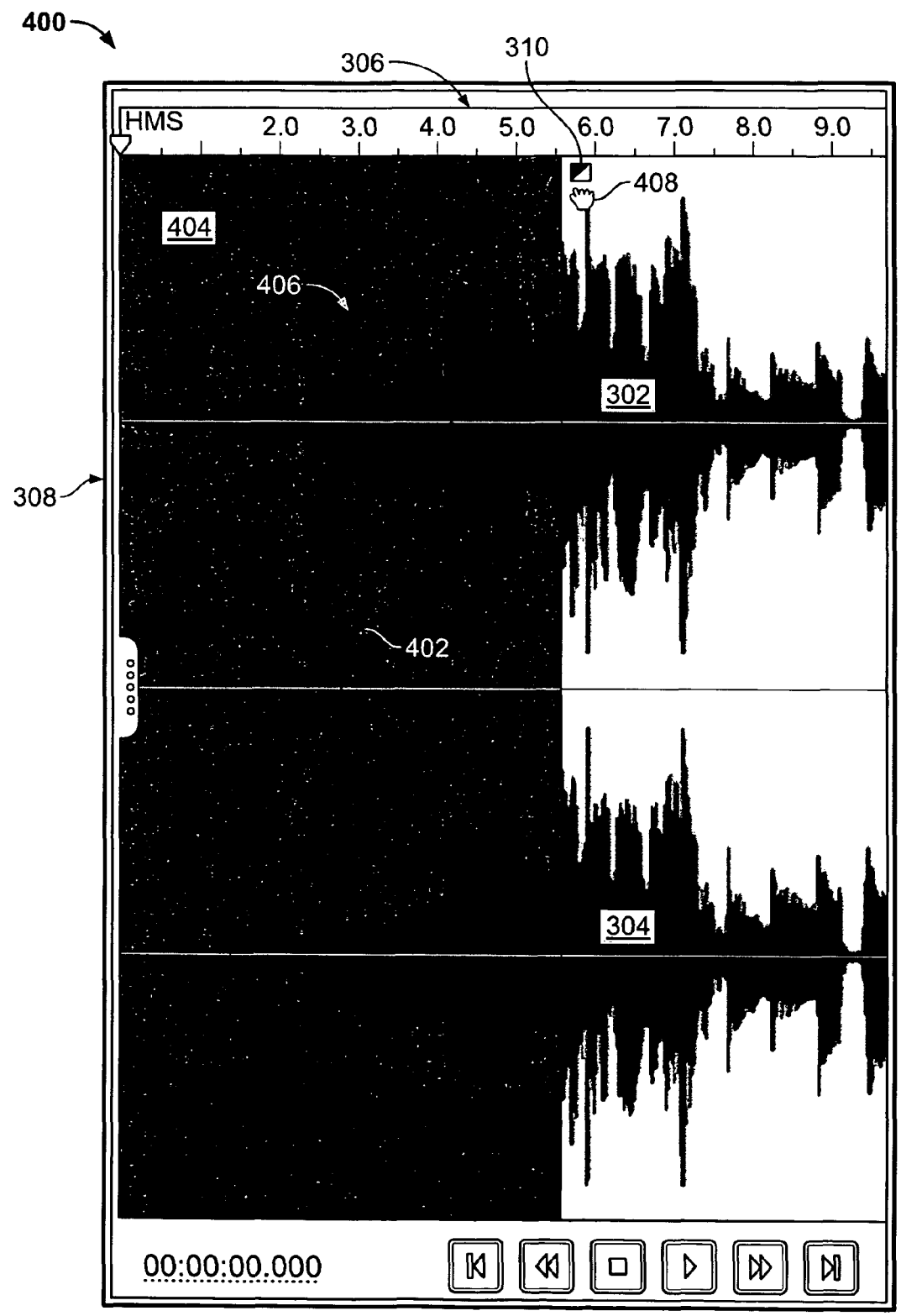
FIG. 4 shows an example display of amplitude waveforms with a user input fade amount.

FIGS. 4-8 show example displays for setting a fade amount for audio data. FIG. 4 shows an example display 400 of amplitude waveforms with a user input fade amount. The display 400 shows amplitude waveforms 302 and 304 (e.g., representing two distinct audio channels). The display 400 also includes horizontal time axis 306 and a vertical intensity axis for the respective amplitude waveforms 302 and 304. The fade tool 310 is shown having been dragged horizontally from the starting position shown in FIG. 3. The horizontal position of the fade tool 310 allows a user to set a fade length with respect to time.

A shaded fade region 404 visually indicates the region of the amplitude waveforms 302 and 304 subject to the indicated fade amount. A cursor 408 indicates the user's vertical position relative to the fade tool 310. In some implementations, the cursor 408 is a "hand" icon, which when illustrated as grasping, indicates that an object, e.g., the fade tool 310, is currently being held by the user (e.g., by holding down a key or mouse button).

In the display 400, the cursor 408 is in a starting position relative to the fade tool 310. As a result, the fade shape is linear as shown by line 402. Thus, editing the audio data will provide a linear compression to the amplitude waveforms 302 and 304 across the fade length. The edited waveform 406 provides a visual illustration previewing what the amplitude waveform 302 will be if the shown fade effect is applied.

Figure 5:
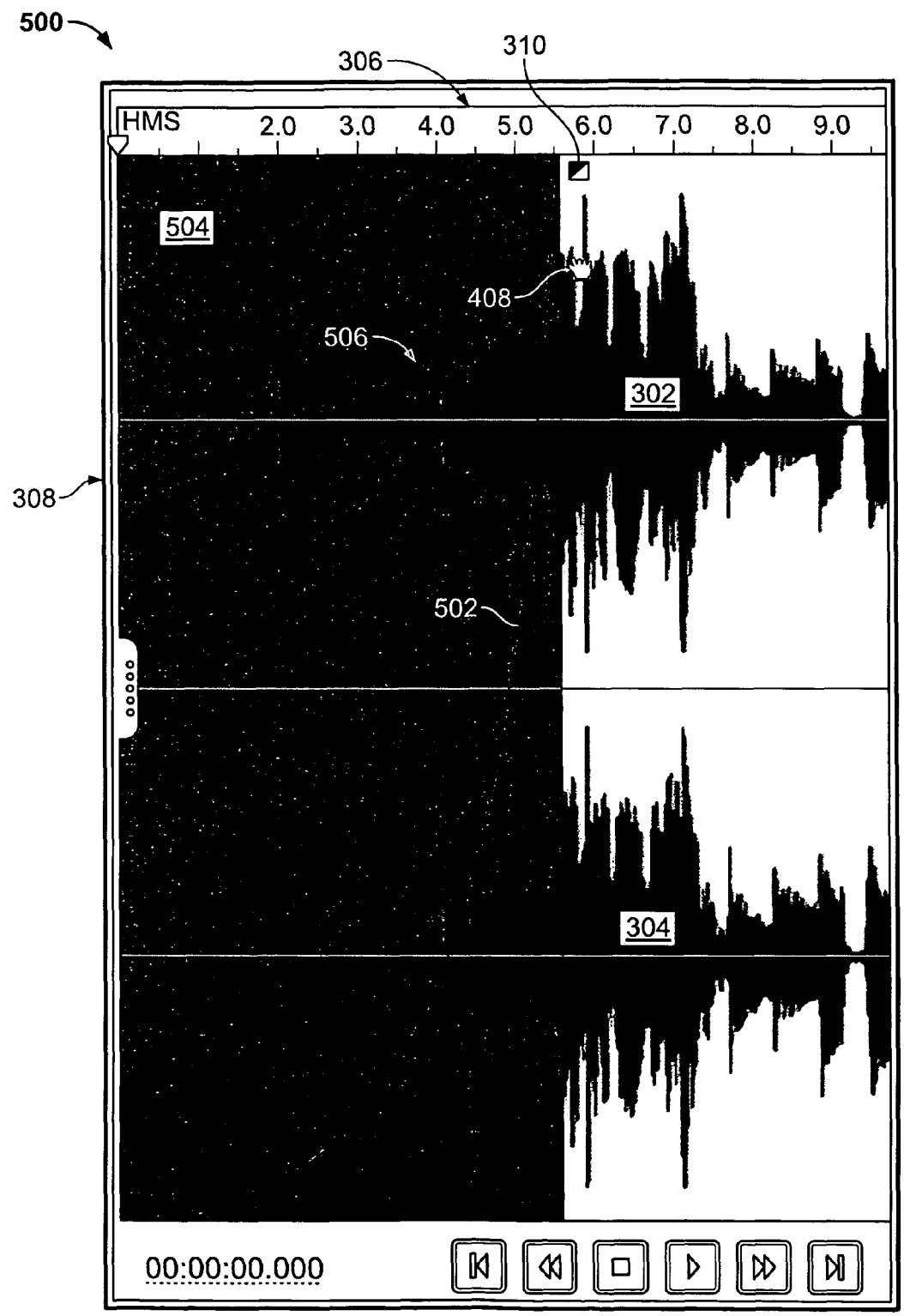
FIG. 5 shows an example display of amplitude waveforms with a user input fade amount.

FIG. 5 shows example display 500 of amplitude waveforms with a user input fade amount. The display 500 shows amplitude waveforms 302 and 304 with respect to the horizontal time axis 306 and vertical intensity axis 308. In FIG. 5, the fade length shown is the same as in FIG. 4 (e.g., the cursor 310 is in the same position relative to the horizontal time axis 306). However, the cursor 408 has been vertically displaced below the fade tool 310 by a particular distance (e.g., by dragging the cursor 408). As a result the shape of the fade has changed from the linear fade of line 402 to an exponential curve 502.

The exponential curve 502 shows that the fade effect will apply compression to the amplitude following an exponential path across the user defined fade length. Additionally, the edited waveform 506 within the fade region 504 shows a much greater effect on the waveform 302 due to the exponential fade versus that shown by editing waveform 406.

Figure 6:
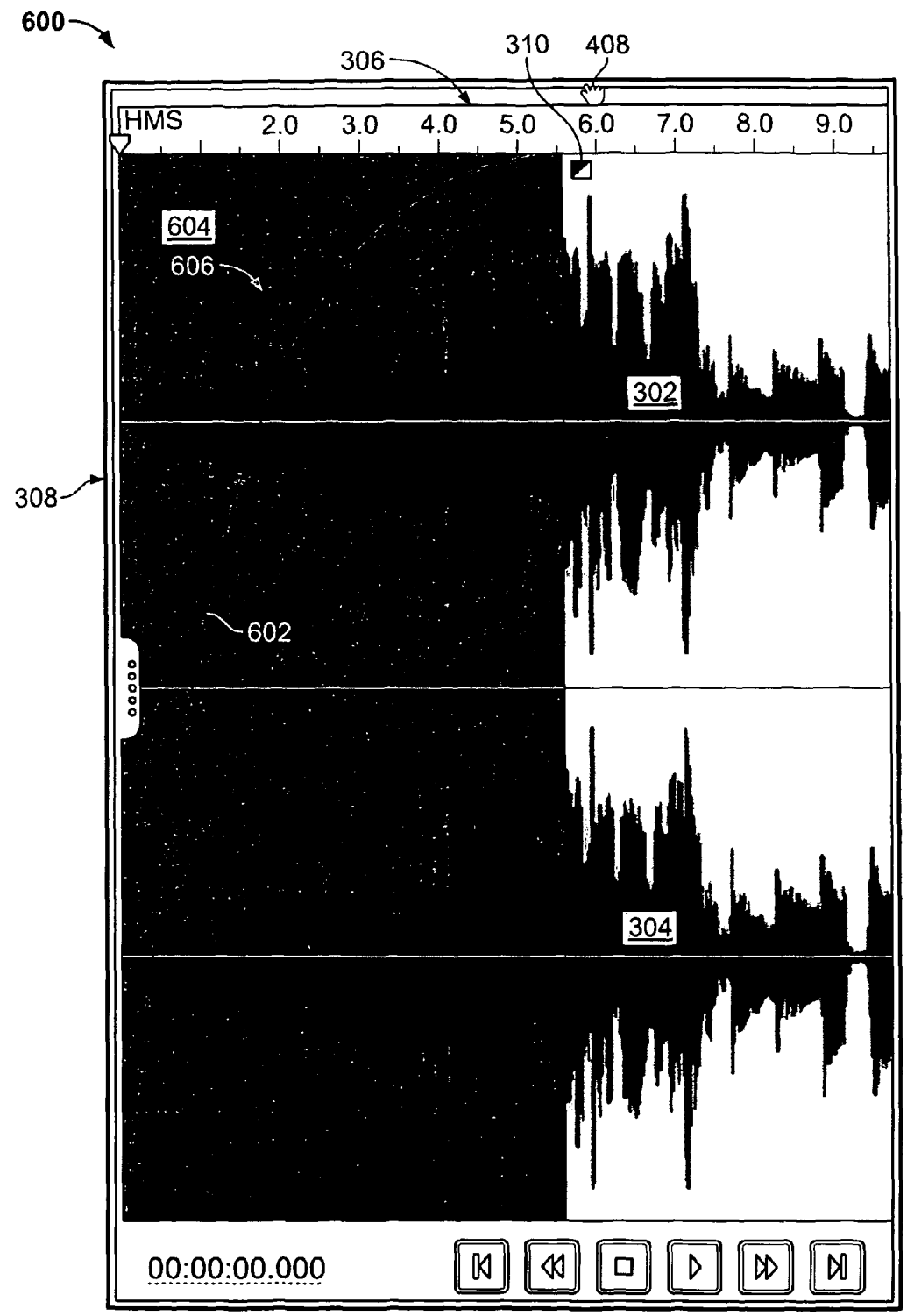
FIG. 6 shows an example display of amplitude waveforms with a user input fade amount.

FIG. 6 shows example display 600 of amplitude waveforms with a user input fade amount. The display 600 shows amplitude waveforms 302 and 304 with respect to the horizontal time axis 306 and vertical intensity axis 308. In FIG. 6, the fade length shown is the same as in FIG. 4 (e.g., the cursor 310 is in the same position relative to the horizontal time axis 306). However, the cursor 408 has been vertically displaced above the fade tool 408 by a particular distance. As a result the shape of the fade has changed from the linear fade of line 402 to logarithmic curve 602.

The logarithmic curve 602 shows that the fade effect will apply compression to the amplitude following a logarithmic path across the user defined fade length. Additionally, the edited waveform 606 within the fade region 604 illustrates a lessened effect on the waveform 302 to be produced by the logarithmic fade function versus that shown by editing waveform 406.

Figure 7:
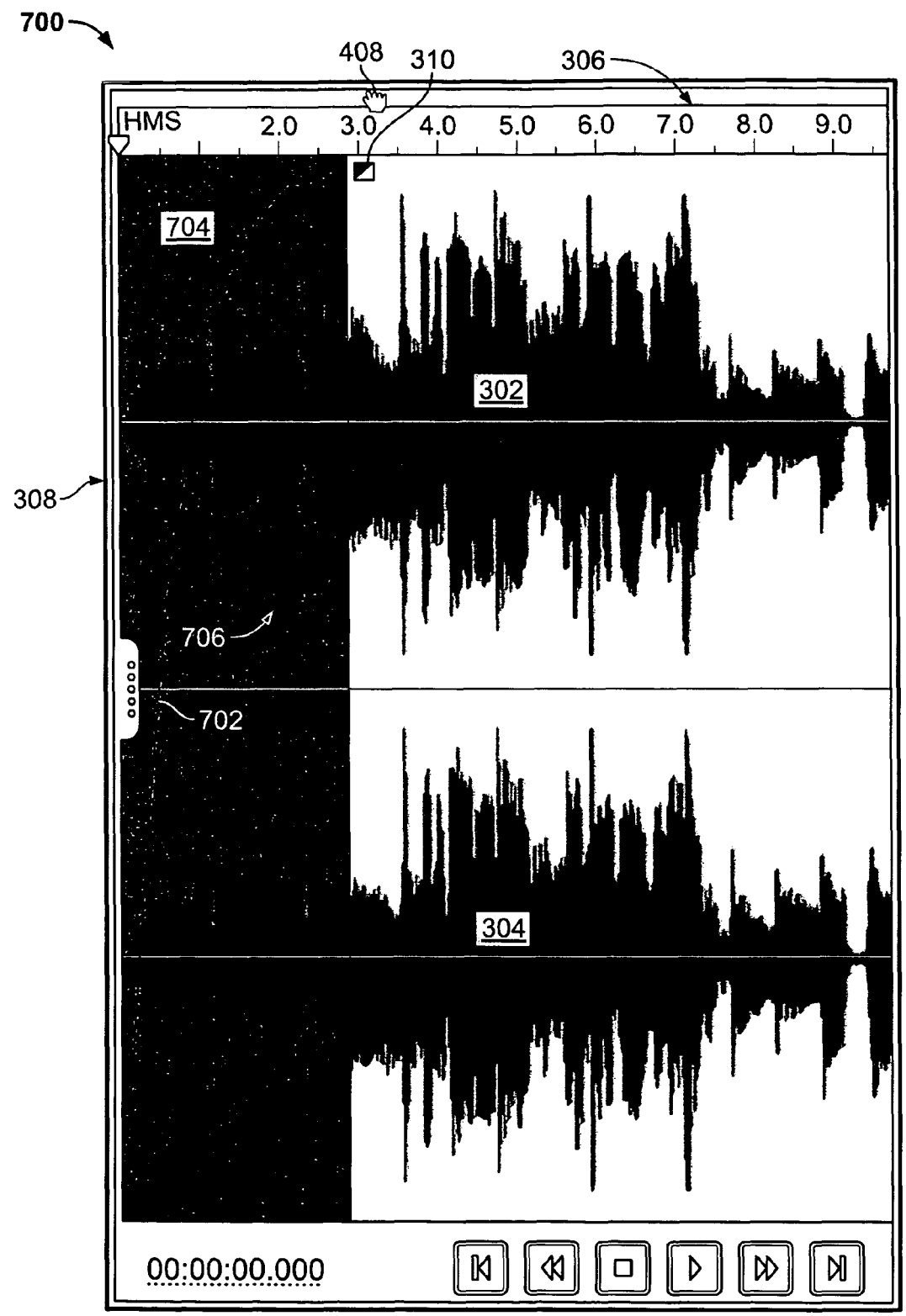
FIG. 7 shows an example display of amplitude waveforms with a user input fade amount.

FIG. 7 shows example display 700 of amplitude waveforms with a user input fade amount. The display 700 shows amplitude waveforms 302 and 304 with respect to the horizontal time axis 306 and vertical intensity axis 308. In FIG. 7, the fade tool 310 has been moved to a different horizontal position, shortening the fade length. The cursor 408, however, remains vertically displaced above the fade tool 310. Thus, a logarithmic curve 702 is still shown, but the fade length is shortened to fade region 704. As with FIG. 6, the edited waveform 706 illustrates a preview of the effect on the amplitude waveform 302 for a fade effect applied according to the logarithmic curve 702.

The movement of the cursor 408 can be part of a single input, where user selects the fade tool 310 and moves the cursor 408 to various positions while the fade tool 310 remains selected (e.g., held by the user with the cursor 408). Thus, the movement to various fade lengths and fade shapes (e.g., as shown in FIGS. 4-7) can be provided by a seamless user input based on movement of the cursor 408. The fade curve is not fixed until the cursor 408 is released.

Figure 8:
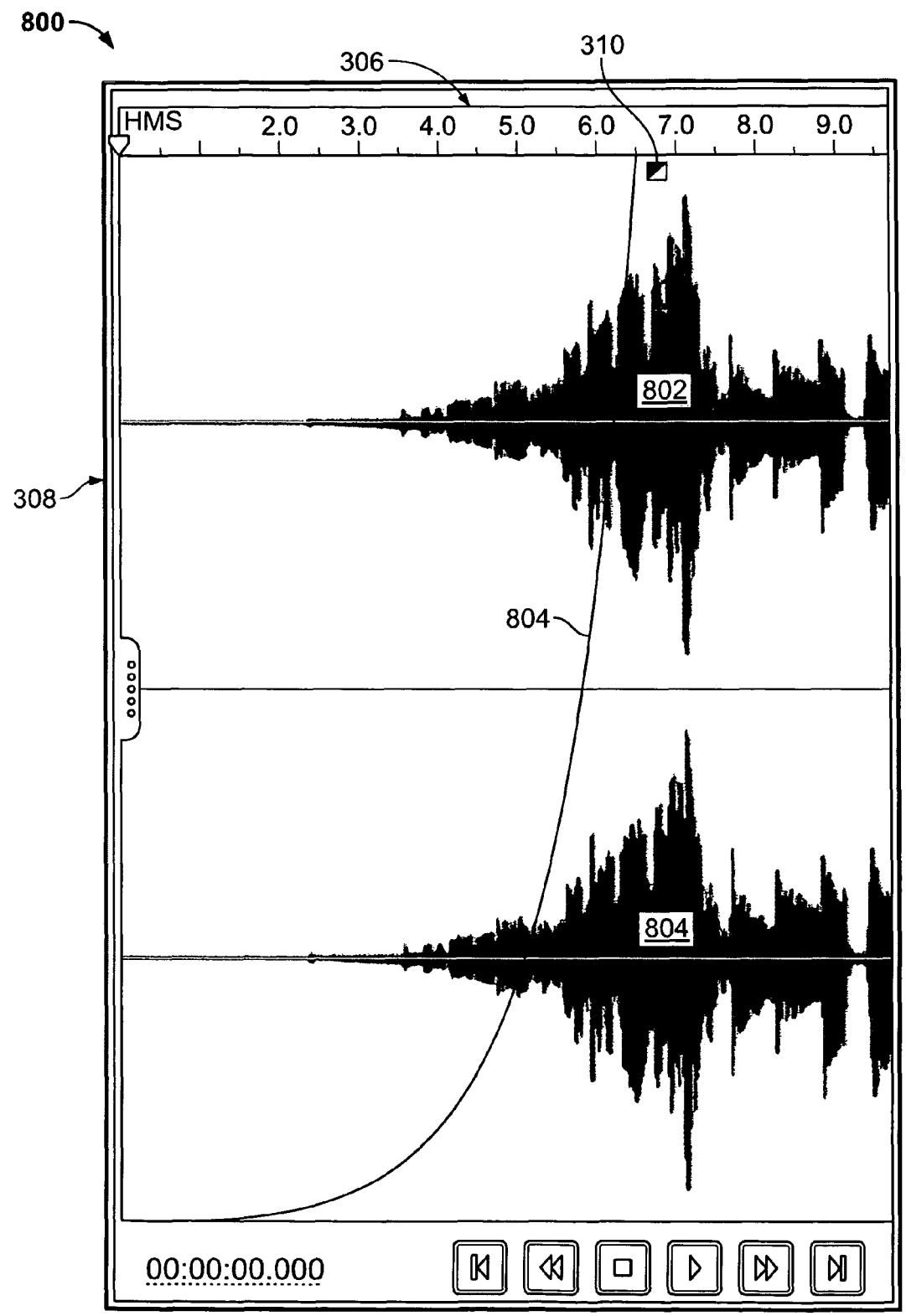
FIG. 8 shows an example display of amplitude waveforms after fade operation.

FIG. 8 shows example display 800 of edited amplitude waveforms following application of a fade amount. The display 800 shows edited amplitude waveforms 802 and 804 with respect to the horizontal time axis 306 and vertical intensity axis 308. The edited amplitude waveform 802 and 804 illustrate the resulting amplitude waveforms after application of the fade effect. Cursor 310 shows the horizontal position of the user defined fade length and the exponential curve 804 shows the resulting shape of the fade based on user cursor position. For example, once the user has positioned the cursor 310 to define a particular fade shape and length, the user can deselect the fade tool 310 in order to execute the defined fade (e.g., by releasing a held key or mouse button).

In some implementations, the editing occurs automatically once the user releases the fade tool. Alternatively, the release of the fade tool fixes the length and shape of the fade, allowing the user to view the effect prior to initiating the editing operation produce the fade in the audio data. In either case, the system can optionally allow the user perform an undo operation to restore the audio data to the state prior to defining a fade amount.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer-readable medium. The propagated signal is an artificially generated signal, e.g., a machine-generated electrical, optical, or electromagnetic signal, that is generated to encode information for transmission to suitable receiver apparatus for execution by a computer. The computer-readable medium can be a machine-readable storage device, a machine-readable storage substrate, a memory device, a composition of matter effecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method comprising:
   receiving digital audio data;
   displaying a visual representation of the audio data in a user interface;
   displaying a fade tool with respect to the visual representation of the audio data; and
   receiving a single graphical user input gesture via the fade tool, the single user input gesture defining a fade curve and applying the fade curve to the audio data, wherein defining the fade curve via the single user input gesture includes:
      specifying a fade length of a fade effect based on a first displacement of a cursor from the fade tool along a first axis in the user interface;
      specifying a fade shape of the fade effect based on a second displacement of the cursor relative to the fade tool along a second axis in the user interface, the specified fade shape defining a linear shape, an exponential shape, or a logarithmic shape dependent upon a direction of the cursor displacement relative to the second axis such that displacement in a first direction defines a first fade shape and displacement in a second direction defines a different second fade shape.

2. The method of claim 1, wherein the first axis is a time axis and wherein specifying the fade length includes determining a position of the cursor along the time axis in the visual representation.

3. The method of claim 1, wherein the second axis is a fade shape axis and setting the fade shape includes determining a position of the cursor along the fade shape axis in the visual representation.

4. The method of claim 3, wherein the position of the cursor along the fade shape axis is determined according to a distance from the fade tool to the cursor along the fade shape axis.

5. The method of claim 3, further comprising:
   using an algorithm to associate the position of the cursor along the fade shape axis with a function defining a shape of the fade.

6. The method of claim 1, wherein the first fade shape is an exponential curve and the second fade shape is a logarithmic curve.

7. The method of claim 1, further comprising:
   displaying a visual representation of the fade effect.

8. The method of claim 1, wherein the visual representation of the audio data is modified to preview the fade effect.

9. The method of claim 1, further comprising:
   editing the audio data according to the fade effect including applying a gain function to the audio data according to the defined fade shape and fade length.

10. The method of claim 1, wherein the first axis is a horizontal axis and the second axis is a vertical axis.

11. The method of claim 1, further comprising linking the cursor to the fade tool responsive to receiving the single graphical user input gesture.

12. A computer program product, encoded on a non-transitory computer-readable medium, operable to cause data processing apparatus to perform operations comprising:
   receiving digital audio data;
   displaying a visual representation of the audio data in a user interface;
   displaying a fade tool with respect to the visual representation of the audio data; and
   receiving a single graphical user input gesture to the fade tool, the single user input gesture defining a fade curve and applying the fade curve to the audio data, wherein defining the fade curve via the single user input gesture includes:
      specifying a fade length of a fade effect based on a first displacement of a cursor relative to the fade tool along a first axis in the user interface;
      specifying a fade shape of the fade effect based on a second displacement of the cursor relative to the fade tool along a second axis in the user interface, the specified fade shape defining a linear shape, an exponential shape, or a logarithmic shape dependent upon a direction of the cursor displacement relative to the second axis such that displacement in a first direction defines a first fade shape and displacement in a second direction defines a different second fade shape.

13. The computer program product of claim 12, wherein the first axis is a time axis and wherein specifying the fade length includes determining a position of the cursor along the time axis in the visual representation.

14. The computer program product of claim 12, wherein the second axis is a fade shape axis and wherein specifying the fade shape includes determining a position of the cursor along the fade shape axis in the visual representation.

15. The computer program product of claim 14, wherein the position of the cursor along the fade shape axis is determined according to a distance from the fade tool to the cursor along the fade shape axis.

16. The computer program product of claim 14, further comprising:
using an algorithm to associate the position of the cursor along the fade shape axis with a function defining a shape of the fade.

17. The computer program product of claim 12, further comprising:
displaying a visual representation of the fade effect.

18. The computer program product of claim 12, wherein the visual representation of the audio data is modified to preview the effect of the fade.

19. The computer program product of claim 12, further comprising:
editing the audio data according to the fade effect including applying a gain function to the audio data according to the define fade shape and fade length.

20. A method comprising:
receiving digital audio data;
displaying a visual representation of the audio data within a user interface;
displaying a fade tool at a location within the user interface over the visual representation of the audio data; and
receiving a graphical user input selecting the fade tool with a cursor and dragging the cursor from the fade tool relative to a time axis to apply a fade effect to the audio data, the position of the cursor taken along the time axis specifying a fade length of the fade effect, and dragging the cursor a distance and direction from the fade tool along a fade shape axis thereby specifying a fade shape of the fade effect, a first direction of the cursor from the fade tool along the fade shape axis defining a first fade shape type and a second direction of the cursor from the fade tool along the fade shape axis defining a second fade shape type, the first and second fade shape types being different and selected from a linear shape, an exponential shape, or a logarithmic shape.

21. A method comprising:
receiving digital audio data;
displaying a visual representation of the audio data;
displaying a fade tool at a location over the visual representation of the audio data; and
receiving a graphical user input selecting the fade tool at the location with a cursor and moving the cursor relative to the location of the displayed fade tool to apply a fade effect to the audio data, movement of the cursor parallel to a time axis changing a fade length of the fade effect, and movement of the cursor perpendicular to the time axis changing a fade shape of the fade effect, the fade shape including a type and a magnitude of fade, the type of fade being dependent upon the direction of the cursor displacement such that displacement in a first direction perpendicular to the time axis defines a first fade type and displacement in a second direction perpendicular to the time axis defines a second fade type, the first and second fade types being different and selected from a linear shape, an exponential shape, or a logarithmic shape.

22. A system comprising:
a user interface device; and
one or more computers operable to interact with the user interface device and to:
receive digital audio data,
display a visual representation of the audio data in a user interface,
display a fade tool with respect to the visual representation of the audio data, and
receive a single graphical user input gesture to the fade tool, the single user input gesture defining a fade curve and applying the fade curve to the audio data, the fade curve specifying a fade length and a fade shape of a fade effect based on a displacement of a cursor associated with the single user input gesture from the fade tool along respective axes in the user interface, wherein specifying the fade shape includes specifying an amount of fade and a type of fade, the type of fade being dependent upon the displacement of the cursor relative to the fade tool such that displacement of the cursor in a first direction relative to the fade tool defines a first fade type and displacement of the cursor in a second direction relative to the fade tool defines a second fade type, the first and second fade types being different and selected from a linear shape, an exponential shape, or a logarithmic shape.

23. The system of claim 22, wherein the one or more computers comprise a server operable to interact with the user interface device through a data communication network, and the user interface device is operable to interact with the server as a client.

24. The system of claim 23, wherein the user interface device comprises a personal computer running a web browser or a mobile telephone running a WAP browser.

25. The system of claim 22, wherein the one or more computers comprises one personal computer, and the personal computer comprises the user interface device.

26. The system of claim 22, wherein the displacement of the cursor in the first direction relative to the fade tool and the displacement of the cursor in the second direction relative to the fade tool is based on a pixel distance between the cursor and the fade tool.

27. The system of claim 22, wherein the amount of fade is defined by a distance between the cursor and the displayed fade tool.

* * * * *